US011770568B2

(12) United States Patent
Perry, II et al.

(10) Patent No.: US 11,770,568 B2
(45) Date of Patent: *Sep. 26, 2023

(54) CONTROL BASED STREAM INTERRUPTIONS

(71) Applicant: Syncbak, Inc., Marion, IA (US)

(72) Inventors: Jack F. Perry, II, Cedar Rapids, IA (US); Steven C. Maher, Marion, IA (US)

(73) Assignee: Syncbak, Inc., Marion, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,912

(22) Filed: Jan. 4, 2022

(65) Prior Publication Data

US 2022/0132188 A1 Apr. 28, 2022

Related U.S. Application Data

(63) Continuation of application No. 16/891,180, filed on Jun. 3, 2020, now Pat. No. 11,252,448.

(60) Provisional application No. 62/856,798, filed on Jun. 4, 2019.

(51) Int. Cl.
*H04N 21/234* (2011.01)
*H04N 21/44* (2011.01)
*H04N 21/2365* (2011.01)

(52) U.S. Cl.
CPC ... *H04N 21/23424* (2013.01); *H04N 21/2365* (2013.01); *H04N 21/44016* (2013.01)

(58) Field of Classification Search
CPC ....... H04N 21/23424; H04N 21/44016; H04N 21/2365; H04N 21/4882; H04N 21/4758; H04N 21/8586; H04N 21/4333
See application file for complete search history.

(56) References Cited

U.S. PATENT DOCUMENTS

| 11,252,448 B2 | 2/2022 | Perry, II et al. |
| 2004/0034873 A1* | 2/2004 | Zenoni ................. H04N 7/173 |
| 2010/0077018 A1 | 3/2010 | Acharya et al. |

(Continued)

OTHER PUBLICATIONS

Notice of Allowance and Fee(s) due for U.S. Appl. No. 17/646,919, dated Jan. 17, 2023, (9 pages), United States Patent and Trademark Office, US.

*Primary Examiner* — Anthony Bantamoi
(74) *Attorney, Agent, or Firm* — ALSTON & BIRD LLP

(57) ABSTRACT

Systems and methods are configured to provide alternate content during video streaming. Content made up of a plurality of blocks is streamed over a first video stream to a user computing device via a first URI. While streaming, a determination is made that alternate content is available. In response, a signaling mechanism is provided indicating such and a request for the alternate content is received. As a result, a particular block that is currently being provided over the first video stream is suspended and the alternate content is streamed to the user computing entity over a second video stream. Depending on the embodiment, the second video stream may be accessed by re-activating the first URI or by activating a second URI. Upon completion of the alternate content, the particular block that was suspended can be resumed to facilitate continued streaming of the content over the first or second video stream.

18 Claims, 11 Drawing Sheets

(56) References Cited

U.S. PATENT DOCUMENTS

2013/0219023 A1    8/2013   Surianarayanan et al.
2014/0282704 A1    9/2014   Tumuluru et al.
2015/0172342 A1    6/2015   Yin

* cited by examiner

CONTROL BASED STREAM INTERRUPTIONS

CROSS REFERENCE TO RELATED APPLICATIONS

This application is a continuation of U.S. patent application Ser. No. 16/891,180 filed Jun. 3, 2020, which claims priority to U.S. Provisional Patent Application 62/856,798 filed Jun. 4, 2019, the contents are herein incorporated by reference in their entireties.

BACKGROUND

Streaming live or on-demand video over networks is an increasingly popular choice for media consumption. Typically, video content that is streamed is prepared and published in predefined blocks of time (e.g., playlists), such as in blocks/playlists/segments ranging from 30-120 seconds, or blocks/amount of data. Normally, when a block/playlist/segment is published to a media player, no element (e.g., frame) of that block/playlist/segment may subsequently be changed with the following exception: the oldest element of the block/playlist/segment may be deleted and a new element may be added to the end of the playlist. Thus, if a media player has received a block/playlist/segment which is 120 seconds in length, and an emergency event occurs that the streaming service wishes to provide to the media player, the service may only add that information to the end of the playlist in the current framework. In other words, the media player will play 120 seconds of video before reaching the emergency event information.

Therefore, a need exists for improved methods, apparatus, systems, computer program products, computing devices, computing entities, and/or the like for interrupting a video stream to provide users with alternate content.

BRIEF SUMMARY

In general, embodiments of the present invention provide methods, apparatus, systems, computing devices, computing entities, and/or the like for providing alternate content during video streaming. For example, the alternate content may be an emergency message, news break, and/or weather advisory. In various embodiments, content is streamed over a first video stream to a user computing device that is accessed via a first uniform resource indicator (URI). Here, the content is made up of a plurality of blocks that are provided over the first video stream to facilitate streaming of the content over the first video stream.

While streaming the content over the first video stream, a determination may be made that alternate content is available to be provided to the user computing entity. In response, a signaling mechanism is provided in some embodiments to the user computing entity indicating the alternate content is available. Accordingly, a request for the alternate content may be received from the user computing entity and as a result, a particular block of the plurality of blocks that is currently being provided over the first video stream is suspended and the alternate content is streamed to the user computing entity over a second video stream. Here, depending on the embodiment, the second video stream may be accessed by re-activating the first URI or by activating a second URI that is different than the first URI.

Upon completion of streaming the alternate content over the second video stream, the particular block that was suspended may be resumed to facilitate continued streaming of the content. Here, depending on embodiment, the continued streaming of the content may be conducted over the first video stream or the second video stream.

In some embodiments, the request for the alternate content is received as a result of a user of user computing entity indicating a desire to view the alternate content. While in some embodiments, the user computing entity may be provided with a request to activate the first URL to switch back to the first video stream upon completion of streaming the alternate content over the second video stream. While in some embodiments, the continued streaming of the content is a result of receiving a notice from the user computing entity. Finally, in some embodiments, the alternate content may be overlaid onto the first video stream instead of being streamed over the second video stream.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

Figure 1:
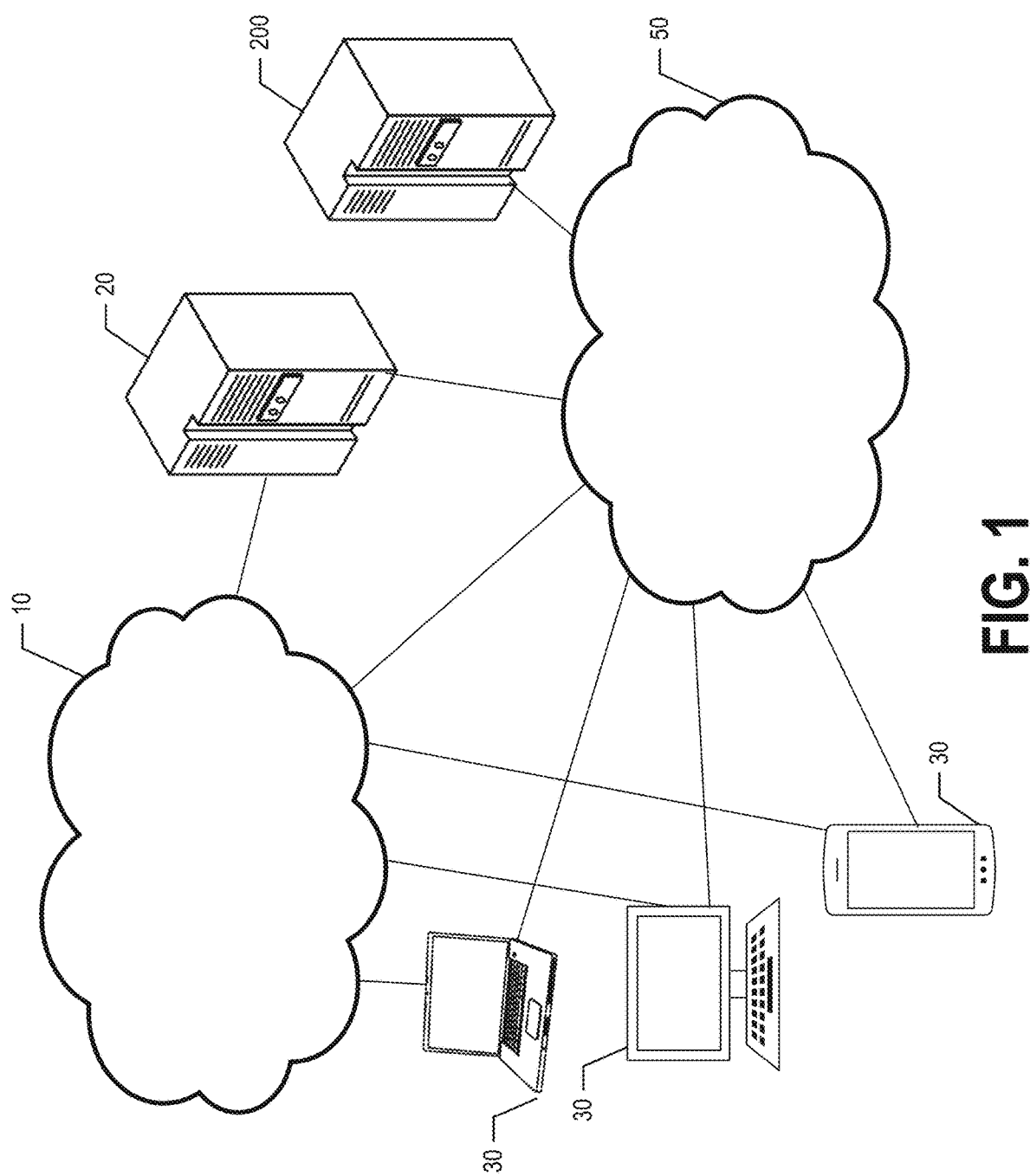
FIG. 1 illustrates one embodiment of a system for producing and providing a user with an enhanced media presentation in accordance with one embodiment the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, and Computer Program Products

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. General Overview

Embodiments of the present invention provide methods, apparatus, systems, computer program products, computing devices, computing entities, and/or the like for interrupting content on a video stream to provide alternate content in real-time. In various embodiments, a video stream may be provided to a user via live or on demand video streaming. Content on the video stream may be presented in blocks/playlists/segments at predefined time intervals, with each block/playlist/segment representing a block of time (e.g., period of time) in the video stream. For example, content to be streamed may be prepared and published in blocks/playlists/segments of 30-120 seconds. In this regard, media players rely on published blocks/playlists/segments to provide continuity to the users/viewers.

When a user/viewer is provided a video stream, there are technical challenges in providing alternate content and/or notifications that alternate content is available in real-time while a particular block/playlist/segment of content is being provided over the video stream. Thus, various embodiments of the invention may provide alternate content on a separate stream or overlaid on the current stream. Accordingly, various system architectures that may be used in accordance with the present invention are now described herein.

III. Exemplary System Architecture

FIG. 1 illustrates a system that may be used in accordance with various embodiments of the present invention. Here, the illustrated system may include one or more content distribution/delivery networks (CDNs) 10, one or more intermediary systems 20, one or more user computing entities 30, and one or more provider networks/systems 200. The one or more CDNs 10, one or more intermediary systems 20, the one or more user computing entities 30, and the one or more provider systems 200 may communicate with each other and/or a variety of other computing entities via one or more wired or wireless networks 50. Although described separately, it will be recognized that two or more of the above entities can be combined or included in a single platform.

Content Distribution/Delivery Networks 10

In various embodiments, the one or more CDNs 10 may comprise networks configured for distributing media content. Examples of CDNs may include national and local television channel content providers such as, for example, Fox, CBS, The Weather Channel, and/or the like. Generally, the term "content" may refer to any type of media—audio, videos, datacasts, music, text, images, graphics, articles, photos, photo galleries, video galleries, infographics, maps, polls, guest biographies, tweets or other social media, blog posts, and/or the like. For example, content may include television broadcasts (e.g., live local newscasts), television programs (e.g., The Office), sporting events, movies (e.g., video-on-demand (VOD)), datacasts, music, images, videos, text, webpages, and/or the like. Thus, the CDN 10 may be configured for providing a user with media content via a broadcast, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

Although not shown, an IP-based CDN (also referred to as a CDN 10) may be used with embodiments of the present invention. An IP-based CDN may include various components to transmit/broadcast content and/or data/information (e.g., transmit broadcast signals in a one-to-many or broadcast configuration) to user computing entities 30 (e.g., subscribers). Thus, the IP-based CDN can transmit/broadcast (comprising content and/or data) to user computing entities 30 using a variety of standards and protocols, such as those described previously.

Provider System 200

Herein the term "provider" is used to indicate any entity, individual, organization, company, group or the like that provides or assists in providing one or more users with at least one media presentation such as, for example, providing media content over a video stream. Examples of providers may include entities such as YouTube TV, Netflix, Sling, Amazon Video, Hulu, and/or the like. Similarly, providers may also include national and local television channel content providers—such as Fox, CBS, The Weather Channel, and/or the like. The term "production staff" is used to indicate any individual involved with the production of at least one media presentation. The term "viewer," "user," and similar words used herein interchangeably may indicate any individual, family, entity, organization, company, group, or the like that accesses, receives, views, and/or experiences media presentations provided by the provider. In some embodiments, the user may access, receive, view, and/or experience media presentations from the provider via a paid or unpaid subscription service for example.

In various embodiments, a provider system 200 may be configured to provide production staff (e.g., operating an appropriate computing entity) with an interactive user interface configured for producing media presentations. The provider system 200 may be further configured to provide media presentations to at least one user. For example, the media presentation may be provided in the form of a live stream and/or an on demand stream (e.g., VOD or the like). In addition, the provider system 200 may be operated by, on behalf of, or in association with a media content provider who provides content that can be provided in media presentations to one or more users.

In general, the terms computing entity, network, network entity, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data/information, content, information, and/or similar terms used herein interchangeably.

Figure 2:
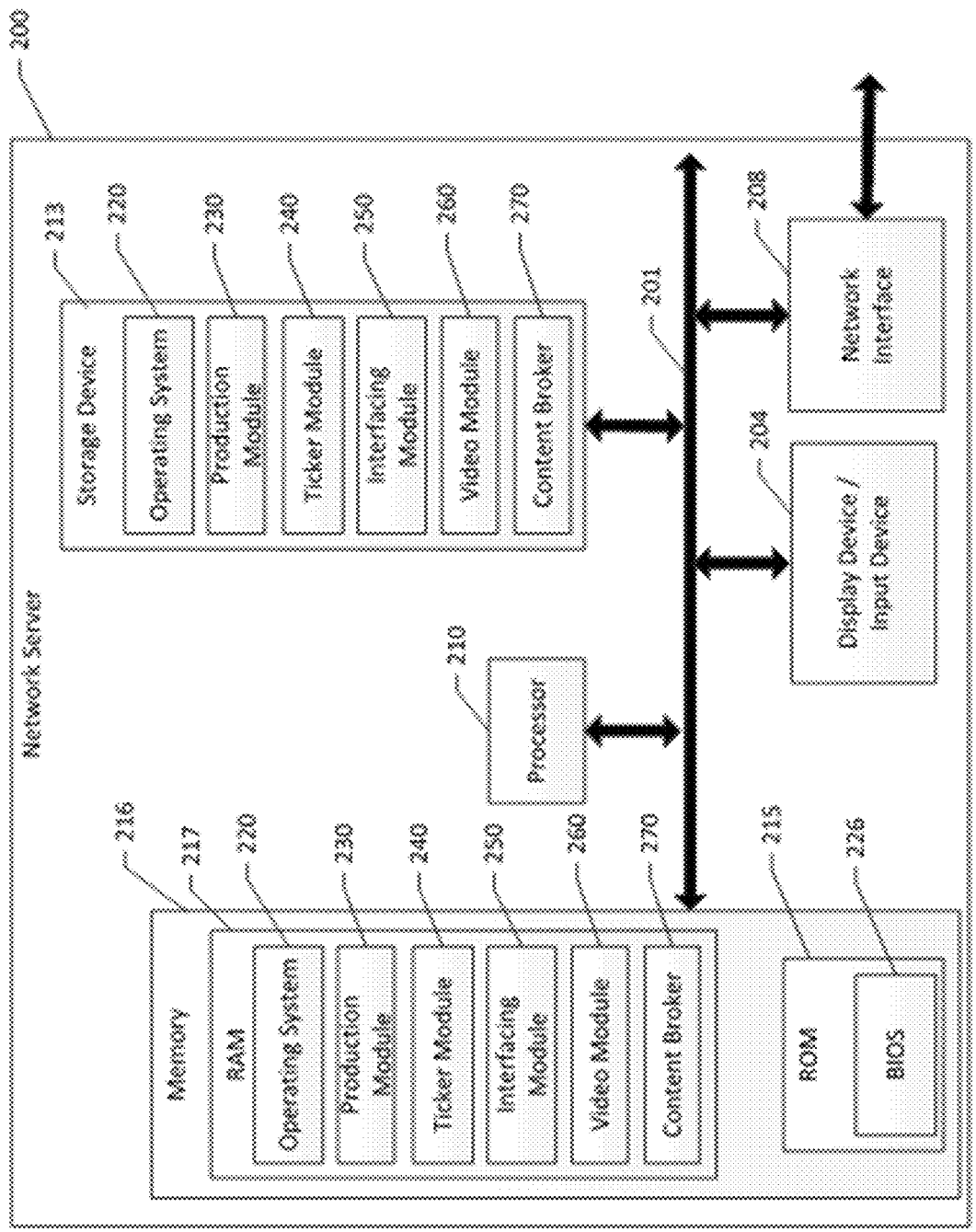
FIG. 2 is a schematic diagram of a provider system used in accordance with embodiments of the present invention.

FIG. 2 provides a schematic diagram of an example provider system 200. The provider system 200 comprises a processor 210, such as one or more processing elements, which may include complex programmable logic devices (CPLDs), microprocessors, multi-core processors, coprocessing entities, application-specific instruction-set processors (ASIPs), and/or controllers or other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to various embodiments of the present invention presented herein when configured accordingly. Accordingly, the processor 210 can be used to execute software instructions for carrying out the defined steps of the methods of the various embodiments of the present invention. The processor 210 communicates using a data/information bus 201 that is used to convey data/information and program instructions, typically, between the processor and memory 216.

The provider system 200 further includes memory 216, which may comprise non-volatile media 215 (also referred to as non-volatile storage, memory, memory storage, memory circuitry and/or similar terms used herein interchangeably). The non-volatile media 215 may be ROM, ROM, PROM, EPROM, EEPROM, and/or the like and my include a BIOS 226 that serves as firmware and is used to perform hardware initialization during the booting process, and to provide runtime services for operating systems and programs.

In addition, the system 200 may include one or more storage devices 213 such as hard disks, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the storage devices 213 may store databases, database instances, database management systems, data/information, applications, programs, program modules, scripts, source code, object code, byte code, compiled code, interpreted code, machine code, executable instructions, and/or the like. Such code may include, for example, the operating system 220, a production module 230, a ticker module 240, an interfacing module 250, a video module 260, and/or a content broker module 270. The terms database, database instance, database management system, and/or similar terms used herein interchangeably may refer to a structured collection of records or data/information that is stored in a computer-readable storage medium, such as via a relational database, hierarchical database, and/or network database.

Further, the provider system 200 may include or be in communication with volatile media 217 (also referred to as volatile storage, memory, memory storage, memory circuitry and/or similar terms used herein interchangeably). In one embodiment, the volatile media 217 may include one or more volatile storage or memory media such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data/information, applications, programs, program modules, scripts, source code, object code, byte code, compiled code, interpreted code, machine code, executable instructions, and/or the like being executed by, for example, the processor 210. Thus, the databases, database instances, database management systems, data/information, applications, programs, program modules, scripts, source code, object code, byte code, compiled code, interpreted code, machine code, executable instructions, and/or the like may be used to control certain aspects of the operation of the provider system 200 with the assistance of the processor 210 and operating system 220, production module 230, ticker module 240, interfacing module 250, video module 260, and/or content broker module 270.

Therefore, as indicated, a number of program modules may be stored by the volatile memory. Such program modules may include the production module 230, ticker module 240, interfacing module 250, video module 260, and/or content broker module 270. Those skilled in the art will appreciate that other modules may be present in RAM to effectuate the various embodiments of the present invention. Furthermore, rather than described modules, other modules may be used or embodiments may not be modular.

The provider system 200 may also include one or more communications interfaces 208 for communicating with various computing entities, such as by communicating data/information, content, information, and/or similar terms used herein interchangeably that can be transmitted, received, operated on, processed, displayed, stored, and/or the like. For instance, the provider system 200 may be in communication with one or more intermediary systems 20 and/or one or more user computing entities 30 via various wired or wireless networks 50. Such communication may be executed using a wired data/information transmission protocol, such as fiber distributed data/information interface (FDDI), digital subscriber line (DSL), Ethernet, asynchronous transfer mode (ATM), frame relay, DOC SIS, Programming Metadata Communication Protocol (PMCP), or any other wired transmission protocol. Similarly, the provider system 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, any other wireless protocol, and/or any other appropriate communications protocol. In various embodiments, the provider system 200 may be configured to communicate with various computing entities to provide at least one video stream to a user computing entity 30.

Various information may be input by a user such as a production staff member (e.g., operating an appropriate computing entity) to the provider system 200 via the network interface 208 and/or input/output device 204. This input information may include information related to a video stream, content associated with a video stream, metadata or other data/information associated with a video stream, data/information associated with one or more users, or other information. This input information may vary, however, depending on the configuration and informational requirements of the provider system 200.

As mentioned above, the provider system 200 also includes an input/output device 204 for receiving and displaying data/information. The provider system 200 may include or be in communication with one or more input elements, such as a keyboard input, a mouse input, a touch screen/display input, audio input, pointing device input, joystick input, keypad input, and/or the like, as indicated by input/output device 204. The provider system 200 may also include or be in communication with one or more output elements, as indicated by input/output device 204, such as audio output, video output, screen/display output, motion output, movement output, and/or the like.

The provider system 200 may be configured to facilitate production and provide users with a video stream. The provider system 200 may further be configured provide a video stream to one or more user computing entities 30 such that the video stream may be displayed via a user interface of a user computing entity 30. The provider system 200 may be further configured to provide production staff (e.g., operating an appropriate computing entity) with an interactive production interface for use in producing a media presentation associated with a video stream. The provider system 200 may be further configured to complete processes related to producing the media presentation associated with the video stream.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the provider system 200 may be located remotely from other provider system 200 components, such as in a distributed system. Furthermore, one or more of the components may be combined and additional components performing functions described herein may be included in the provider system 200. Thus, the provider system 200 can be adapted to accommodate a variety of needs and circumstances.

Intermediary System 20

In various embodiments, the intermediary system 20 may be configured for alerting one or more users/viewers of a live or on-demand video stream that alternate content is available such as breaking news or other content. In other embodiments, this may be performed by the CDN 10 or the provider system 200. In one embodiment, the intermediary system 20 may include one or more components that are functionally similar to those of the provider system 200 or the CDNs 10. For example, in one embodiment, the intermediary system 20 may include one or more processing elements, one or more display device/input devices, volatile and non-volatile storage or memory, one or more storage devices, and/or one or more communications interfaces. The intermediary system 20 may also comprise various other systems. The intermediary system 20 may be in communication with the provider system 200, various user computing entities 30, and/or other computing devices, via one or more wireless or wired networks 50.

User Computing Entity 30

In various embodiments, the user computing entity 30 may be configured to receive at least one video stream and/or data/information associated with at least one video stream and provide the user with content streamed over the video stream. The user computing entity 30 is any system used by a user to receive, view, and/or experience at least one video stream. For example, as described above, a user computing entity 30 may be one or more computers, mobile phones, gaming consoles (e.g., Xbox, Play Station, Wii), desktops, tablets, notebooks, phablets, set-top devices in communication with a television or other display device (e.g., projector or the like), smart televisions, laptops, wearable computer, and/or any combination of devices or entities adapted to perform the functions, operations, and/or processes described herein. In one embodiment, the user computing entity 30 may comprise a combination of two or more computing devices noted above and/or other computing devices. For example, a user computing entity 30 may comprise a set top box "paired" with a tablet.

In one embodiment, the user computing entity 30 may include one or more components that are functionally similar to those of the provider system 200. In one embodiment, the user computing entity 30 may include one or more processing elements, one or more display device/input devices, volatile and non-volatile storage or memory, one or more storage devices, and/or one or more communications interfaces. The user computing entity 30 may also comprise various other systems. In particular, the user computing entity 30 may include components configured to receive a video stream and/or related data/information with audio, visual, and/or other output for experiencing the video stream, and/or the like. The user computing entity 30 may also be in communication with a variety of computing entities.

In various embodiments, the user computing entity 30 may include or otherwise be in communication with a variety of input devices that may be configured to receive input from a user such that a user may control his/her experience of a video stream. For example, in some embodiments, the user computing entity 30 may include or be in communication with a pointing device such as a computer mouse, infrared pointing device, motion detecting device, touchscreen, and/or the like. In other embodiments, the user computing entity 30 may include or be in communication with a joystick, remote control, handheld controller which may include a d-pad, and/or the like. Thus, the user computing entity 30 may be configured to receive user input through a variety of input approaches and techniques.

III. Exemplary System Operation

Figure 9:
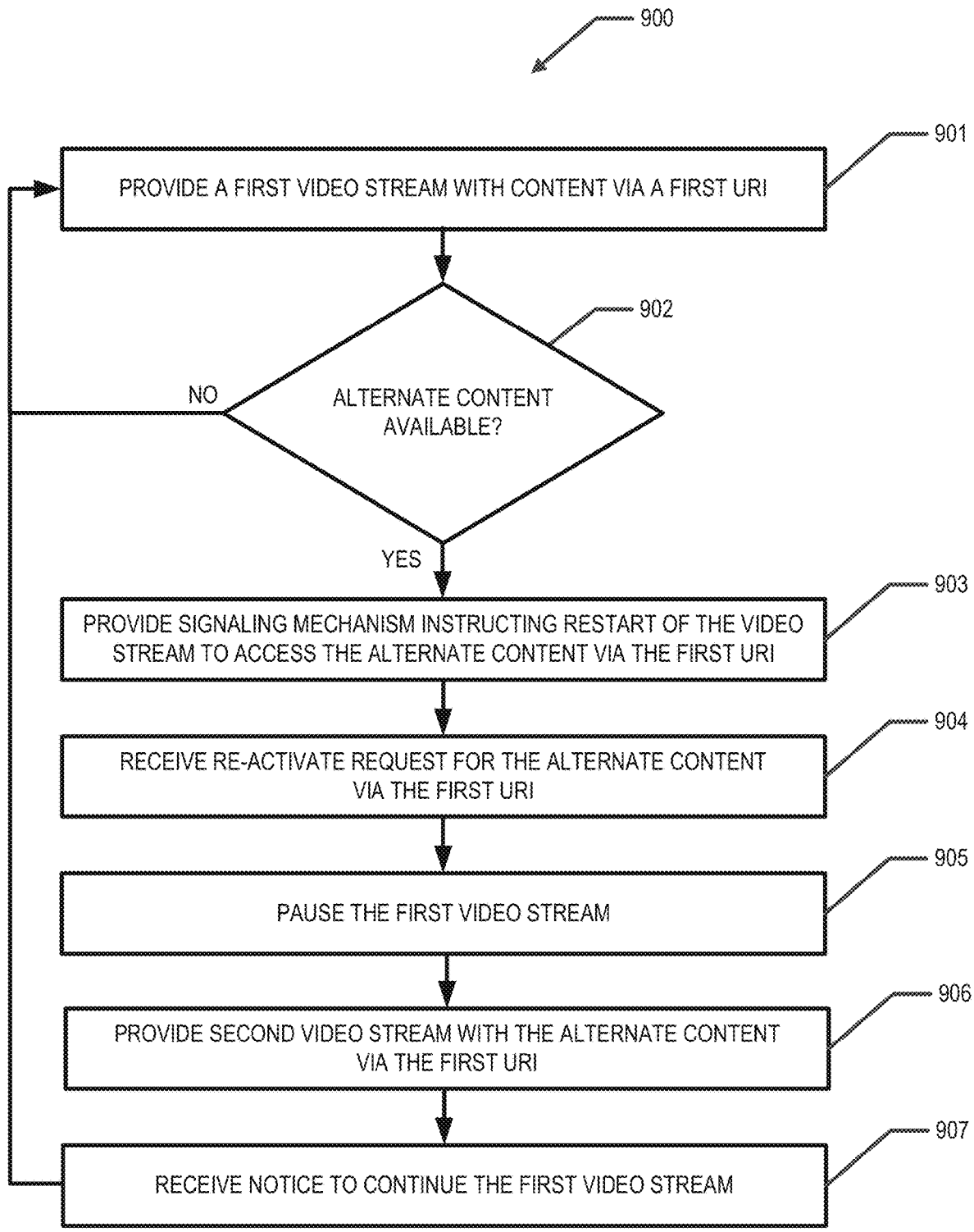
FIGS. 9 and 10 illustrate exemplary flowchart with respect to providing alternate content using a single uniform resource indicator in accordance with one embodiment of the present invention.
Figure 10:
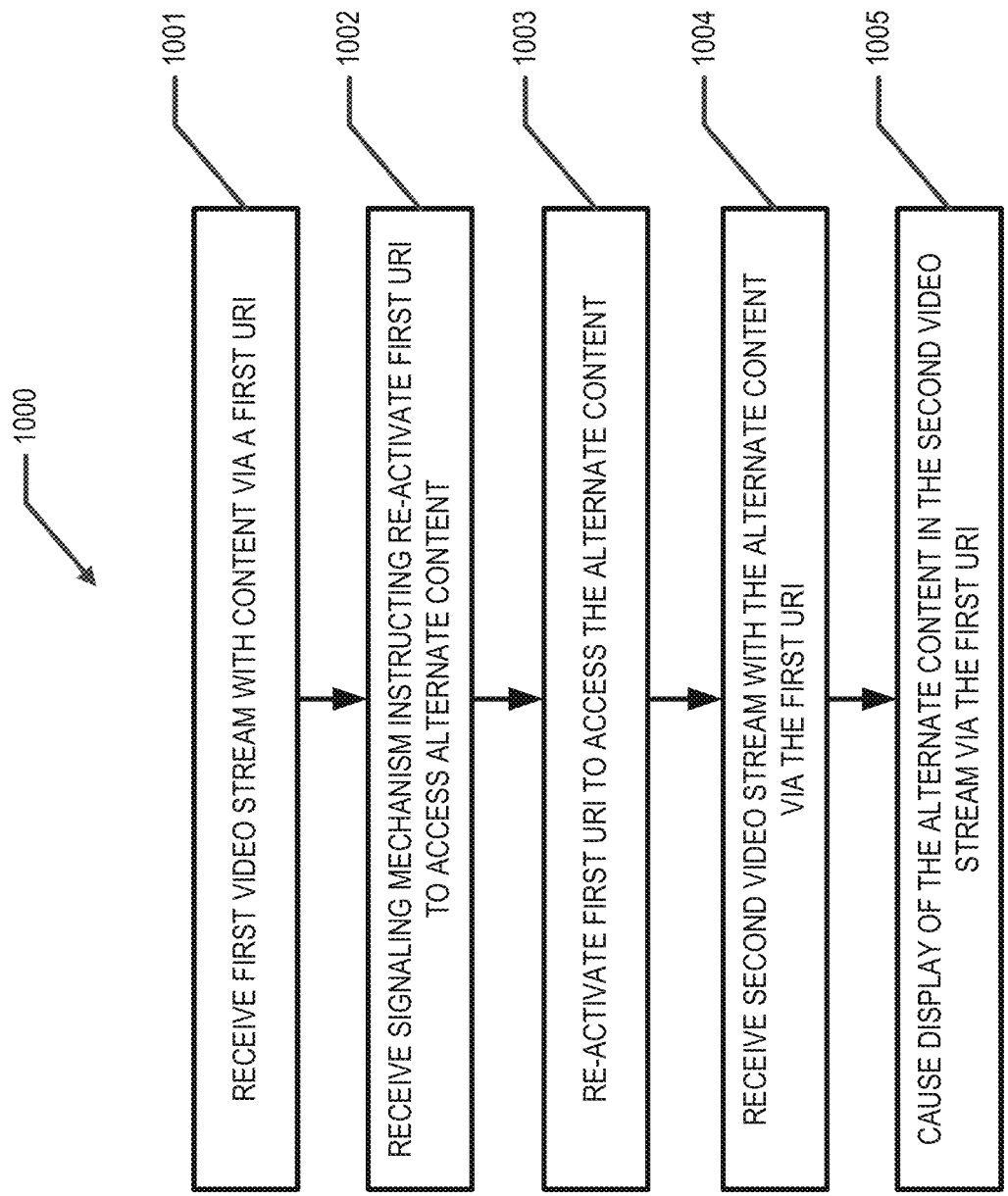
Figure 11:
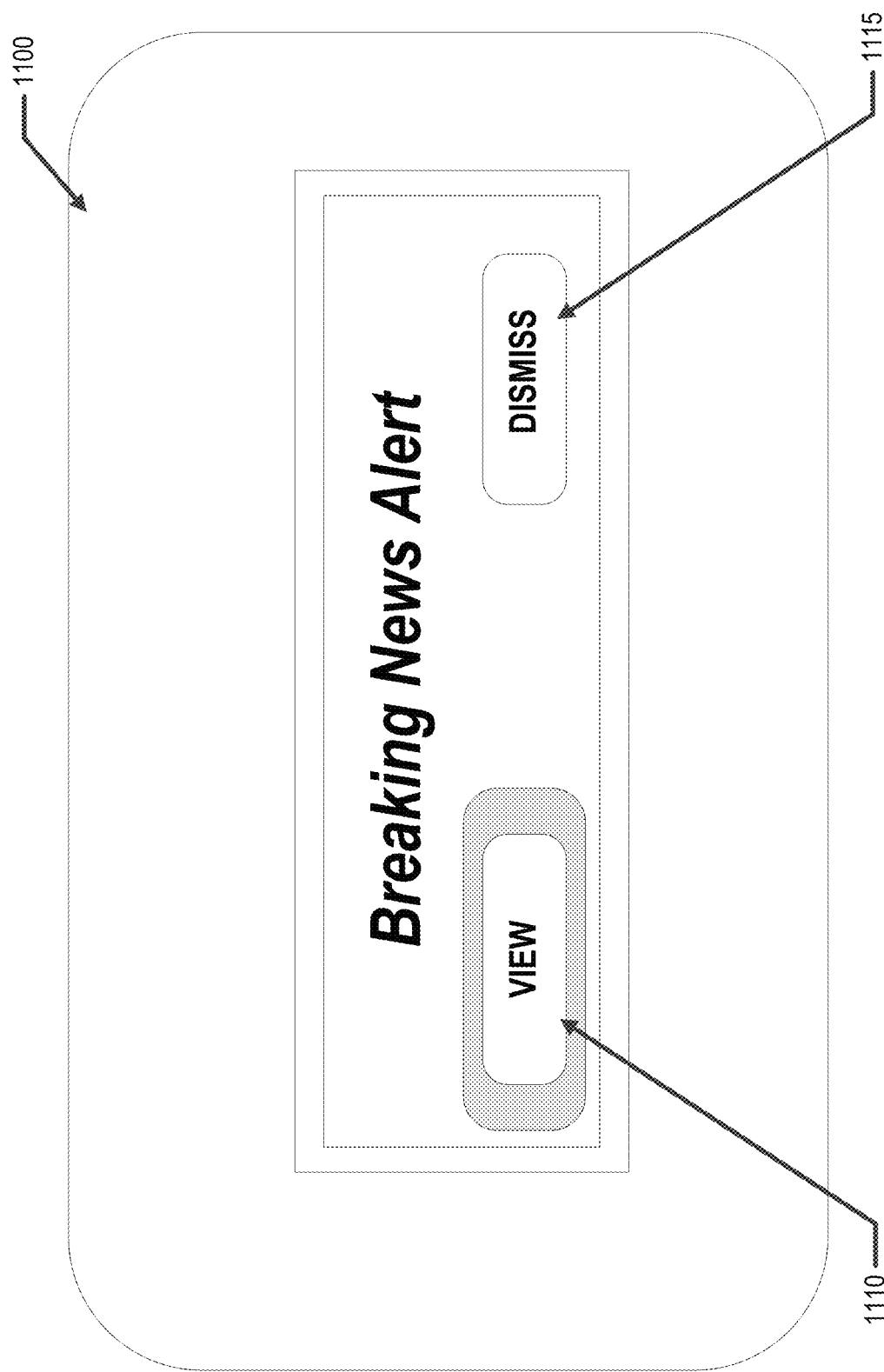
FIG. 11 shows an indication that may be display on an interface of a user computing device in accordance with embodiments of the present invention.

Reference will now be made to FIGS. 3-11. FIGS. 3-10 provide flowcharts illustrating processes, steps, and operations with respect to various embodiments of the invention. FIG. 11 provides an exemplary interactive interface provided on a user computing entity 30.

In one embodiment, an appropriate system/entity (e.g., CDN 10, provider system 200, and/or intermediary system 20) may provide content over one or more video streams to one or more user computing entities 30. In various embodiments, the video streams may be provided to a user via live, VOD, or other streams. As noted, content may be provided over a video stream in blocks/playlists/segments of video. For example, content may be prepared, published, and/or provided in blocks/playlists/segments of 30-120 seconds. Thus, the content may be received and displayed by user computing entities 30 via an interface in this manner.

Typically, when a block/playlist/segment is provided to a user computing entity 30, no element of that block/playlist/segment may subsequently be changed with the following exception: the oldest element of the block/playlist/segment may be deleted and a new element may be added to the end of the block/playlist/segment. Thus, if a user computing entity 30 has received a block/playlist/segment which is 120 seconds in length, and an emergency event (e.g., alternate content) occurs that the streaming service wishes to provide to the user computing entity 30, it may only add that information to the end of the block/playlist/segment in the current framework. In other words, the user computing entity 30 will play 120 seconds of video before reaching the emergency event information (e.g., alternate content).

Embodiments of the present invention disclose approaches for providing alternate content during such blocks/playlists/segments.

As will be recognized, various embodiments can provide alternate content to all users associated with a network, a geographic location, and/or a television station. While in other instances, various embodiments (or combinations thereof) can provide alternate content to subsets of users associated with a particular network, a particular geographic location, and/or a particular television station. Further, various embodiments (or combinations thereof) can provide alternate content to users based on registration preferences, such as registering to only receive alternate content for "events of interest," such as weather or politics. This may be further limited to particular networks, particular geographic locations, and/or particular television stations. A variety of other techniques can be used to adapt to various needs and circumstances.

Example Embodiment: User Selection of Alternate Content Using Multiple URIs

Figure 3:
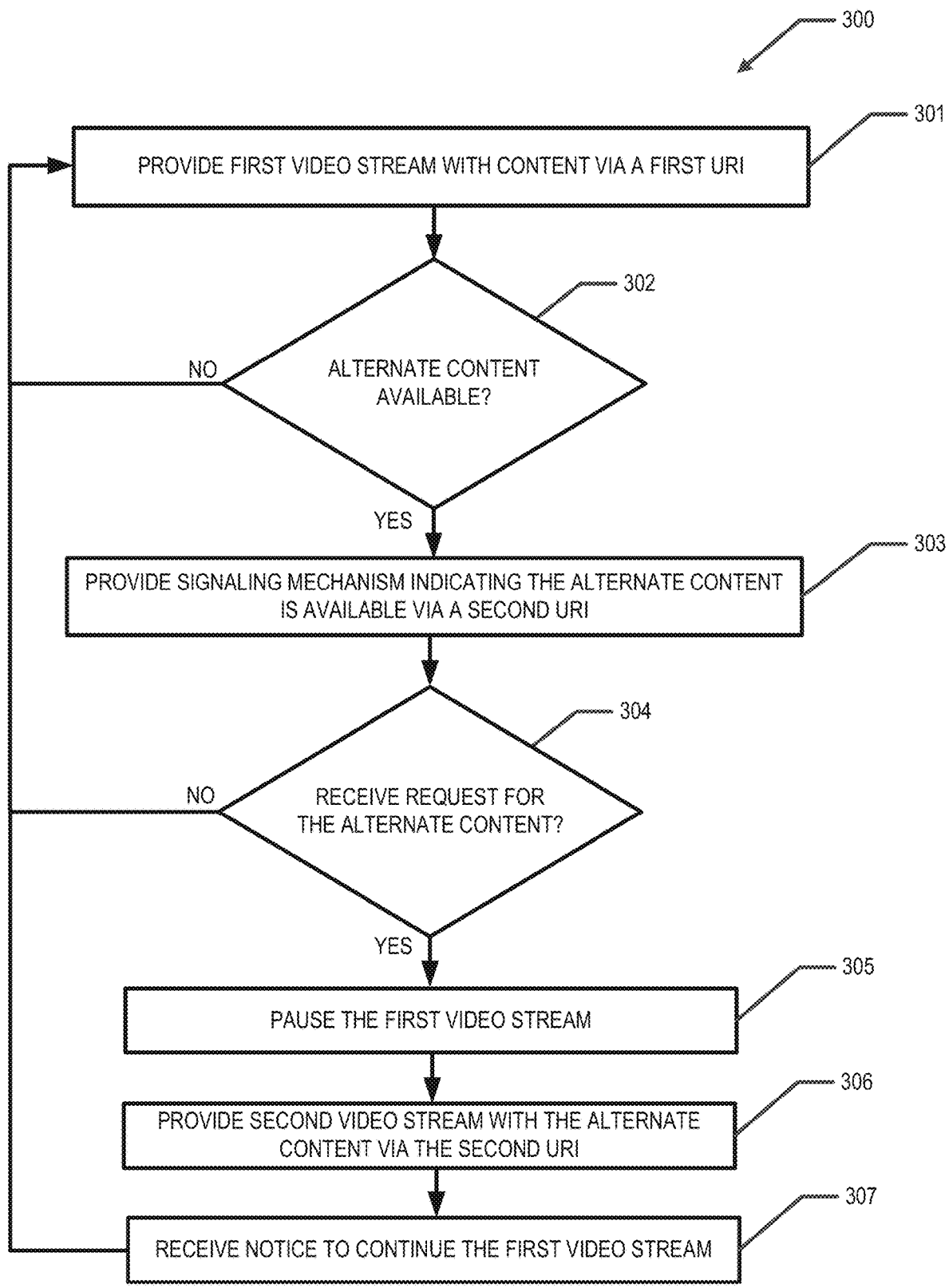
FIGS. 3 and 4 illustrate exemplary flowcharts with respect to providing alternate content using multiple uniform resource indicators in accordance with one embodiment of the present invention.

FIG. 3 shows the steps/operations 300 performed in various embodiments to provide alternate content to a user computing entity 30 by using multiple Uniform Resource Indicators (URIs), such as Uniform Resource Locators (URLs). Accordingly, an appropriate system/entity (e.g., CDN 10, provider system 200, and/or intermediary system 20) provides a first video stream with content (e.g., as blocks/playlists/segments that are 30-120 seconds in length) via a first URI to a user computing entity 30 at step/operation 301. In particular embodiments, the first URI provides the user computing entity 30 with access to the first video stream over which the content is streamed for viewing by a user of the user computing entity 30. For example, the first video stream may be a live stream, a VOD stream, and/or the like that is accessed by selecting the URI. Here, the URI may be selected by the user or automatically by the user computing entity 30.

A situation may arise that may need to be immediately communicated to users who are currently streaming content from the appropriate system/entity. For example, a weather advisory on a potential snowstorm may be received by the system/entity and the system/entity may wish to immediately make the advisory available to its users. Here, the advisory constitutes alternate content. In addition, the alternate content is often time sensitive. Therefore, the weather advisory may be marked with a time period in which it is applicable. For instance, the weather advisory may be in effect for four hours. Therefore, the appropriate system/entity may "post" the advisory as alternate content to make available to streaming users for the four hour duration.

Thus, as the content is being streamed over the first video stream, the appropriate system/entity may determine whether alternate content is available for the user in step/operation 302. If not, then the appropriate system/entity continues to provide the first video stream with the content in step/operation 301.

However, if alternate content is available (e.g., the weather advisory is still in effect), then the appropriate system/entity provides a signaling mechanism to the user computing entity 30 in step/operation 303. The signaling mechanism may include information indicating alternate content that is available to the user for viewing. In addition, the signaling mechanism may provide an instruction requesting input from the user of the user computing entity 30 as to whether the user would like to access the alternate content. The signaling mechanism may also include information in the form of metadata associated with the alternate content. Here, the metadata may provide a second URI associated with the alternate content and/or various commands that may be executed by the user computing entity 30 to invoke the second URI to receive the alternate content to display to the user.

Accordingly, the user may indicate that he or she would like to view the alternate content and if so, then the user computing entity 30 executes the URI(s) and/or commands to request the alternate content. Thus, the appropriate system/entity determines whether it has received a request for the alternate content at step/operation 304. If not, then the appropriate system/entity continues to provide the first video stream without interruption in step/operation 301.

However, if the appropriate system/entity has received a request for the alternate content, then the appropriate system/entity pauses the first video stream in step/operation 305. Here, pausing the first video stream involves suspending the current block/playlist/segment for the content being streamed over the first video stream. For example, if the current block/playlist/segment is streamed over a 120 second time interval and the block/playlist/segment is only 30 seconds into the interval, then the appropriate system/entity suspends the block/playlist/segment at 30 seconds so that no further portion (the remaining time interval) of the block/playlist/segment is streamed over the first video stream to the user computing entity 30. This may involve suspending the block/playlist/segment between elements that make up the block/playlist/segment.

The appropriate system/entity then provides the alternate content via a second video stream associated with the second URI at step/operation 306. As a result, the user computing entity 30 switches from the first video stream to the second video stream by activating the second URI and receives the alternate content over the second video stream. This allows the user computing entity 30 to cause display of the alternate content via the second video stream in real time for viewing before completion of the block/playlist/segment of the content that was currently being streamed over the first video stream. Therefore, in the example, the weather advisory is displayed on the user computing entity 30 to allow the user to view the advisory.

In particular embodiments, once the alternate content has been provided to the user computing entity 30 via the second video stream, the appropriate system/entity may receive a notice from the user computing entity 30 that the alternate content has finished in step/operation 307. At this point, the appropriate system/entity continues the first video stream via the first URI in step/operation 301. Here, the appropriate system/entity may instruct the user computing entity to switch back to the first URL. While in other embodiments, the user computing entity may be configured to automatically switch back to the first URL after completion of the alternate content. As a result, the appropriate system/entity continues streaming the remaining content by beginning with the remainder of the block/playlist/segment that was previously suspended over the first video stream and the user continues viewing the content at the position where he or she left off before viewing the alternate content.

It is noted that in particular embodiments the appropriate system/entity may not resume providing the remaining content over the first video stream but may instead stream the remaining content over the second video stream and not return to the first video stream. Further, it is noted that in some embodiments, the appropriate system/entity may not necessarily receive a notice from the user computing entity 30 that the alternate content has finished but instead may simply switch back to the first video stream (or stream the remaining content over the second video stream) once the appropriate system/entity has finished streaming the alternate content.

Figure 4:
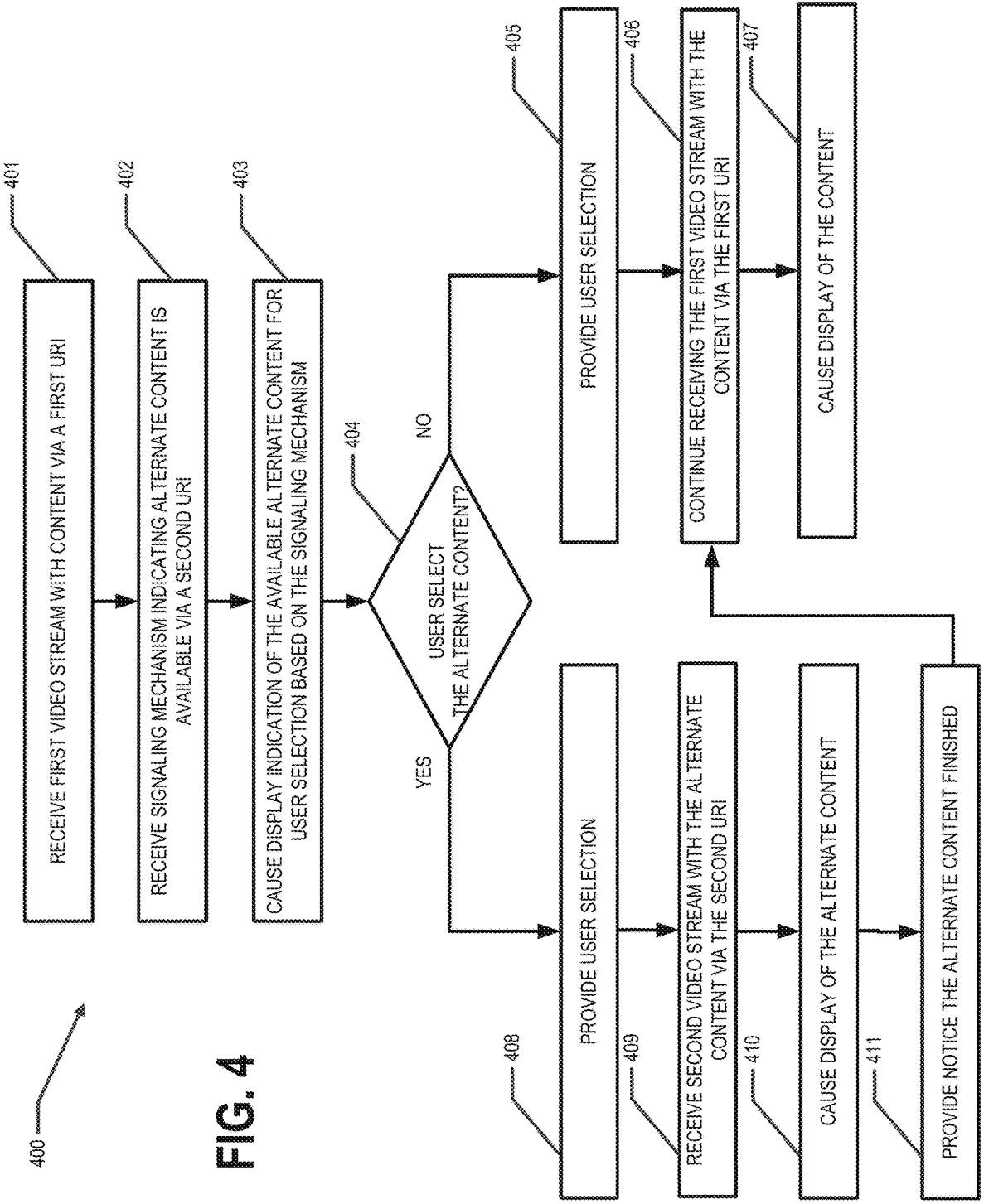

Therefore, turning now to FIG. 4, this figure shows the steps/operations 400 performed in various embodiments by the user computing entity 30 to provide the alternate content to the user. Accordingly, the user computing entity 30 receives the first video stream with content (e.g., as blocks/playlists/segments that are 30-120 seconds in length) via the first URI in step/operation 401 and begins to display the content to the user. In particular instances, the user computing entity 30 may cause display of only a portion of the content in the first video stream.

During the streaming of the first video, the user computing entity 30 receives the signaling mechanism indicating the alternate content is available via the second URI in step/operation 402. As a result, the user computing entity 30 may cause an indication to display on an interface of the user computing entity 30 that alternate content is available that allows the user to select whether to access the alternate content in step/operation 403. For instance, the user interface may graphically present the indication 1100 in the form of a dialog box, control, and/or the like as shown in FIG. 11. Accordingly, the indication 1100 may provide a first mechanism (e.g., a first button 1110) that allows the user to request to view the alternate content and a second mechanism (e.g., a second button 1115) that allows the user to dismiss the indication 1100. In response to the user's selection, the user computing entity 30 may receive the user input (e.g., selection) and determine whether the user would like to view the alternate content at step/operation 404.

If the user does not wish to view the alternate content, the user computing entity 30 provides the selection to the appropriate system/entity at step/operation 405. As a result, the appropriate system/entity continues to provide the content over the first video stream and thus, the user computing entity 30 continues receiving the first video stream with the content via the first URI in step/operation 406. This allows the user computing entity 30 to continue to cause display of the content over the first video stream in an interrupted manner in step/operation 407.

However, if the user does wish to view the alternate content, then the user computing entity 30 provides the selection to the appropriate system/entity at step/operation 408 indicating the user wishes to view the alternate content. In response, the appropriate system/entity pauses the first video stream and provides a second video stream with the alternate content via a second URI. Accordingly, the user computing entity 30 switches from the first video stream to the second video stream and as a result, the user computing entity 30 receives the alternate content over the second video stream in step/operation 409. This allows the user computing entity 30 to cause display of the alternate content over the second video stream in step/operation 410.

Depending on the embodiment and/or alternate content, the user of the user computing entity 30 may be provided a mechanism to indicate when he or she is finished viewing the alternate content. For example, the alternate content may entail a display of emergency weather information along with a button the user may select once he or she is finished reading the information. While in other embodiments, the user computing entity 30 may simply stream the alternate content until it is finished without providing the user with a mechanism to indicate when he or she is finished viewing the alternate content. For example, the user computing entity 30 may display the emergency weather information for a set amount of time (e.g., fifteen seconds).

If the user is provided with a mechanism to indicate when he or she is finished viewing the alternate content, then the user computing entity may receive an indication the user is finished and in response, provide a notice to the appropriate system/entity that the user is finished viewing the alternate content in step/operation 411. As a result of receiving the notice, the appropriate system/entity then continues with providing the content over the first video stream by resuming the block/playlist/segment that was suspended when the user requested to view the alternate content. Accordingly, the user computing entity 30 switches from the second video stream back to the first video stream using the first URI and continues receiving the remaining content over the first video stream in step/operation 406. This allows the user computing entity 30 to cause display of the remaining content over the first video stream in step/operation 407. While in some embodiments, the user computing entity 30 may not switch back to the first video stream but may instead receive the remaining content streamed over the second video stream.

Example Embodiment: Overlay of Alternate Content

Figure 5:
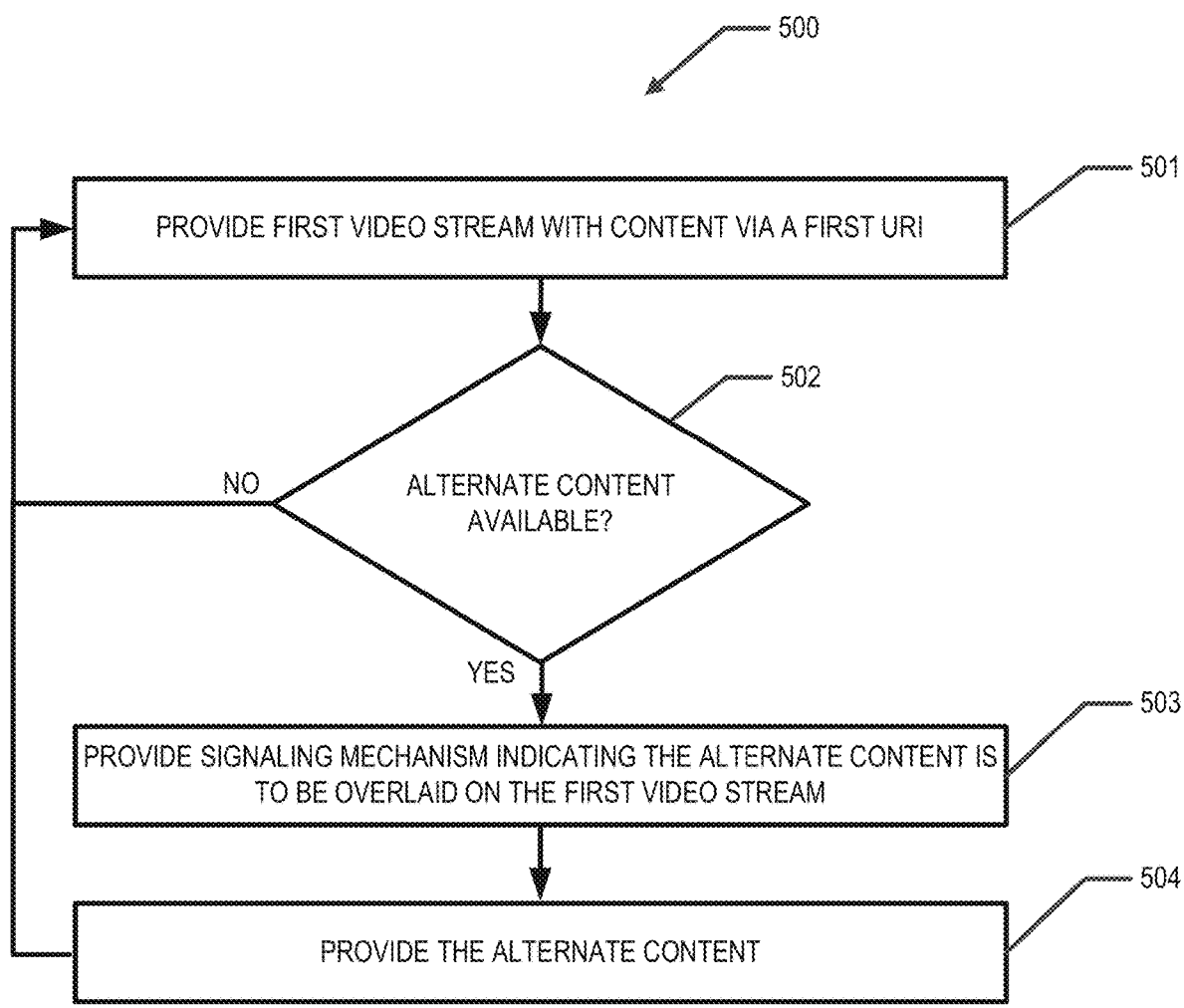
FIGS. 5 and 6 illustrate exemplary flowcharts with respect to providing alternate content overlaid on a video stream in accordance with one embodiment of the present invention.

FIG. 5 shows steps/operations 500 that may be performed by an appropriate system/entity (e.g., CDN 10, provider system 200, and/or intermediary system 20) to provide alternate content. Accordingly, the appropriate system/entity provides a first video stream with content (e.g., as blocks/playlists/segments that are 30-120 seconds in length) via a first URI for presentation to a user computing entity 30 in step/operation 501. For instance, the first video stream may be in the form of a live stream of the first video stream or an on demand stream of the first video stream.

As previously discussed, a situation may arise that may need to be immediately communicated to users who are currently streaming content from the appropriate system/entity. For example, breaking news may be received by the system/entity that the system/entity may wish to immediately make available to its users. Here, the news constitutes alternate content. In addition, the appropriate system/entity may "post" the news as alternate content to make available to streaming users for a set duration of time (e.g., next three hours).

Thus, as the content is being streamed over the first video stream, the appropriate system/entity may determine whether alternate content is available to be streamed to the user in step/operation 502. If not, then the appropriate system/entity continues to provide the first video stream with the content in step/operation 501.

However, if alternate content is available (e.g., the breaking news is still within its set duration of time), then the appropriate system/entity provides a signaling mechanism to the user computing entity 30 at step/operation 503. After providing the signaling mechanism, the appropriate system/entity provides the alternate content to overlay on the first video stream in step/operation 504. In turn, the user computing entity 30 receives the alternate content and overlays the alternate content in the first video stream. Accordingly, the appropriate system/entity continues to provide the content via the first video stream at step/operation 501 and as a result, the user can view the alternate content overlaid on the content being streamed over the first video stream.

For example, the alternate content may be overlaid as a banner or text scroll showing the breaking news as text and/or as visual media such as icons, images, video, and/or the like. Here, the banner or text scroll is typically presented for display as an overlay over a portion of the content streaming over the first video stream so that the content is still viewable in addition to the alternate content. In addition, the signaling mechanism and/or alternate content may include information in the form of metadata identifying a predefined timeout for overlaying the alternate content. For example, metadata may be provided that the alternate content is to be overlaid for a predefined time period such as fifteen seconds before being removed. In certain embodiments, the banner or text scroll may further comprise a link to access additional information associated with the alternate content.

Figure 6:
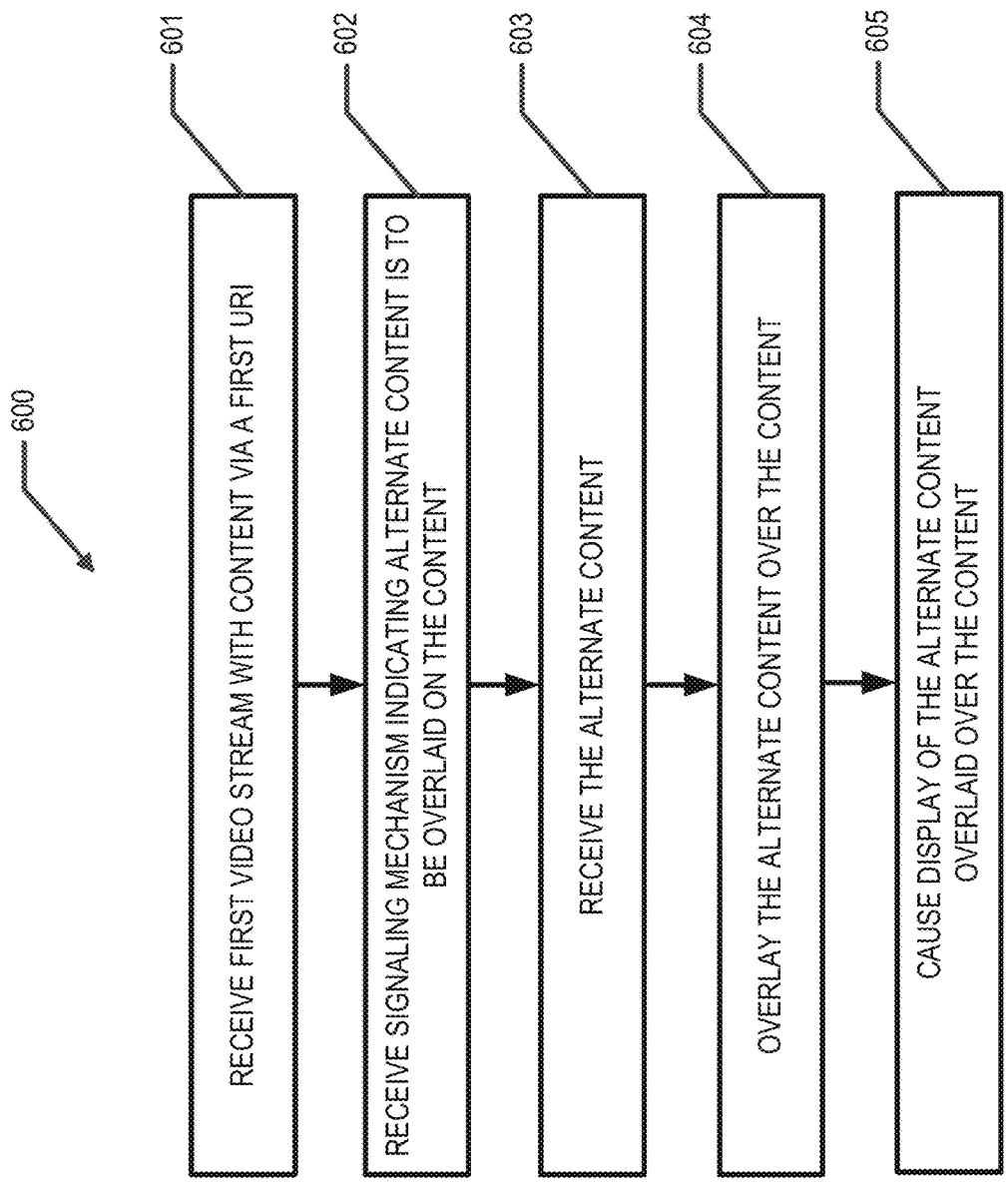

Therefore, turning now to FIG. 6, this figure shows the steps/operations 600 performed in various embodiments by the user computing entity 30 to provide the alternate content to the user by overlaying the alternate content on a first video stream. Accordingly, the user computing entity 30 receives the first video stream with content (e.g., as blocks/playlists/segments that are 30-120 seconds in length) via a first URI from the provider system 200 in step/operation 601.

Here, the appropriate system/entity may determine alternate content is available and send a signaling mechanism to the user computing entity 30 to overlay the alternate content. In addition, the appropriate system/entity may provide the alternate content. Accordingly, the user computing entity 30 receives the signaling mechanism in step/operation 602 and alternate content in step/operation 603. For example, the available alternate content may be a banner or text scroll to be overlaid over a portion of the content being streamed over the first video stream.

In response, the user computing entity 30 overlays the alternate content over the content streaming over the first video stream in step/operation 604. At which point, the user computing entity 30 causes display of the alternate content overlaid over the content streaming over the first videos stream in step/operation 605. This allows the alternate content to be displayed for viewing before completion of the current block/playlist/segment of the content. In one embodiment, the alternate content may be displayed for a predefined time period (e.g., 15 seconds) before being removed. In certain embodiments, the alternate content may further comprise a link that allows the user to access additional information associated with the alternate content.

Figure 7:
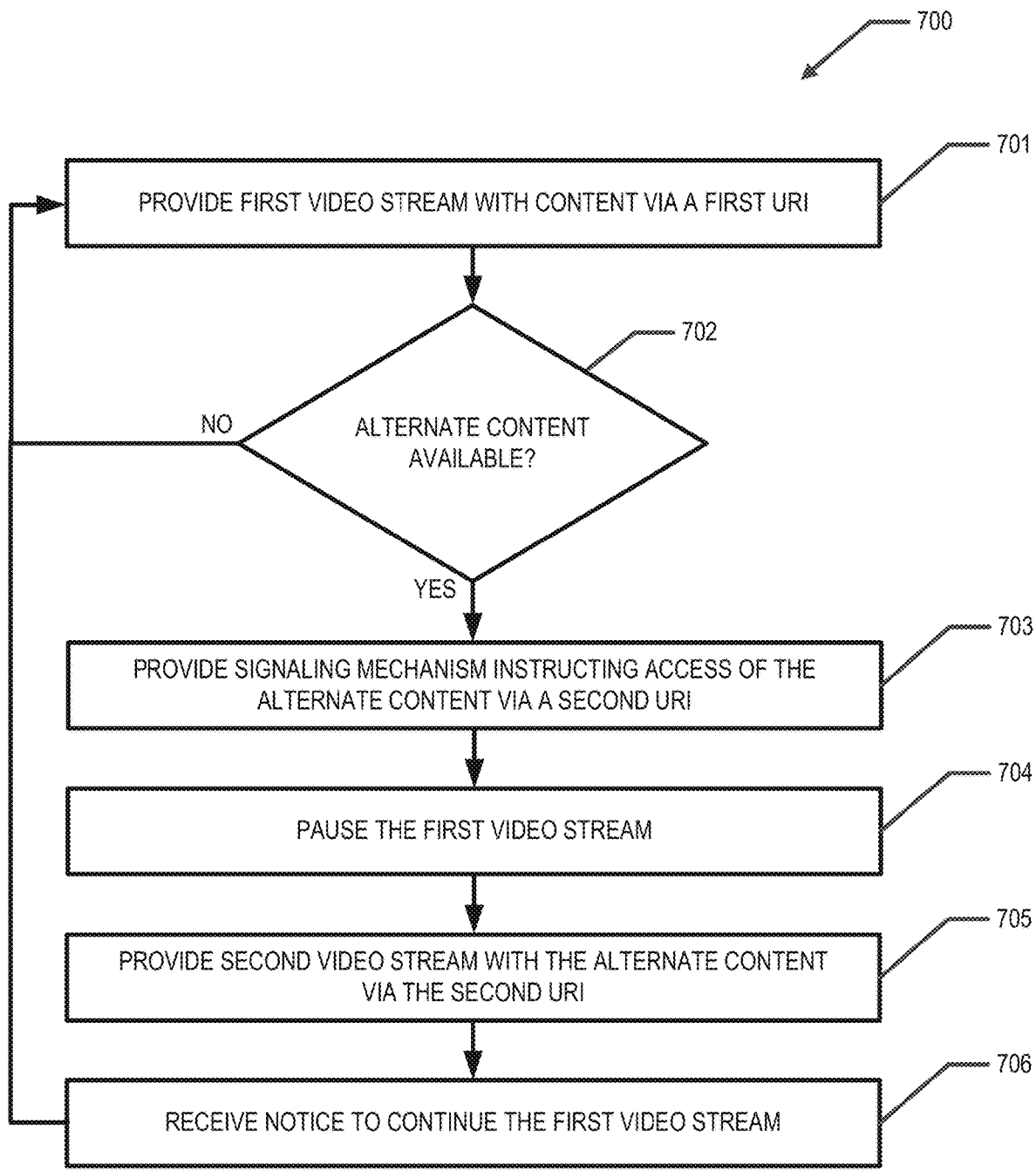
FIGS. 7 and 8 illustrate further exemplary flowcharts with respect to providing alternate content using multiple uniform resource indicators in accordance with one embodiment of the present invention.

Example Embodiment: Command/Instruction for Alternate Content Using Multiple URIs FIG. 7 shows steps/operations 700 that may be performed by an appropriate system/entity (e.g., CDN 10, provider system 200, and/or intermediary system 20) to provide alternate content using multiple URIs. Accordingly, the appropriate system/entity provides a first video stream with content (e.g., as blocks/playlists/segments that are 30-120 seconds in length) via a first URI to a user computing entity 30 in step/operation 701. For instance, the first video stream may be in the form of a live stream of the first video stream or an on demand stream of the first video stream.

As previously discussed, a situation may arise that may need to be immediately communicated to users who are currently streaming content from the appropriate system/entity. Thus, as the content is being streamed over the first video stream, the appropriate system/entity determines whether alternate content is available to be streamed to the user in step/operation 702. If not, then the appropriate system/entity continues to provide the first video stream with the content in step/operation 701.

However, if alternate content is available (e.g., breaking news is available and is still within its set duration of time), then the appropriate system/entity provides a signaling mechanism to the user computing entity 30 at step/operation 703. The signaling mechanism may comprise information regarding the alternate content that is available to the user for viewing. The signaling mechanism may also comprise an instruction for the user computing entity 30 to access the alternate content. For instance, the signaling mechanism may comprise information in the form of metadata that comprises a second URI associated with the alternate content and/or various commands that may be executed to receive the alternate content. Accordingly, the user computing entity 30 receives the signaling mechanism and processes the commands to request the alternate content via a second URI.

As a result, the appropriate system/entity is made aware the second URI has been activated and pauses the first video stream in step/operation 704. As previously discussed, pausing the first video stream involves suspending the current block/playlist/segment for the content being streamed over the first video stream. For example, if the current block/playlist/segment is streamed over a 120 second time interval and the block/playlist/segment is only 30 seconds into the interval, then the appropriate system/entity suspends the block/playlist/segment at 30 seconds so that no further portion (the remaining time interval) of the block/playlist/segment is streamed over the first video stream to the user computing entity 30.

Accordingly, the appropriate system/entity then provides a second video stream with the alternate content at step/operation 705 that is received by the user computing entity 30. This allows the user computing entity 30 to switch to the second video stream using the second URI in real time and to cause display of the alternate content via the second video stream for viewing before completion of the current block/playlist/segment of the content being streamed over the first video stream.

In particular embodiments, once the alternate content has been provided to the user computing entity 30 via the second video stream, the appropriate system/entity may receive a notice from the user computing entity 30 that the alternate content has finished in step/operation 706. At this point, the appropriate system/entity continues to provide the remaining content in particular embodiments over the first video stream in step/operation 701. This may entail the appropriate system/entity resuming the block/playlist/segment that was suspended to continue streaming the content from where it left off prior to providing the alternate content.

Here, the appropriate system/entity may instruct the user computing entity 30 to switch back to the first URL. While in other embodiments, the appropriate system/entity may instead provide the remaining content over the second video stream and not return to the first video stream. Further, it should be noted that in some embodiments, the appropriate system/entity may not necessarily receive a notice from user computing entity 30 that the alternate content has finished but instead may simply continue with streaming the remaining content over the first video stream (or streaming the remaining content over the second video stream) once the appropriate system/entity has finished streaming the alternate content.

Figure 8:
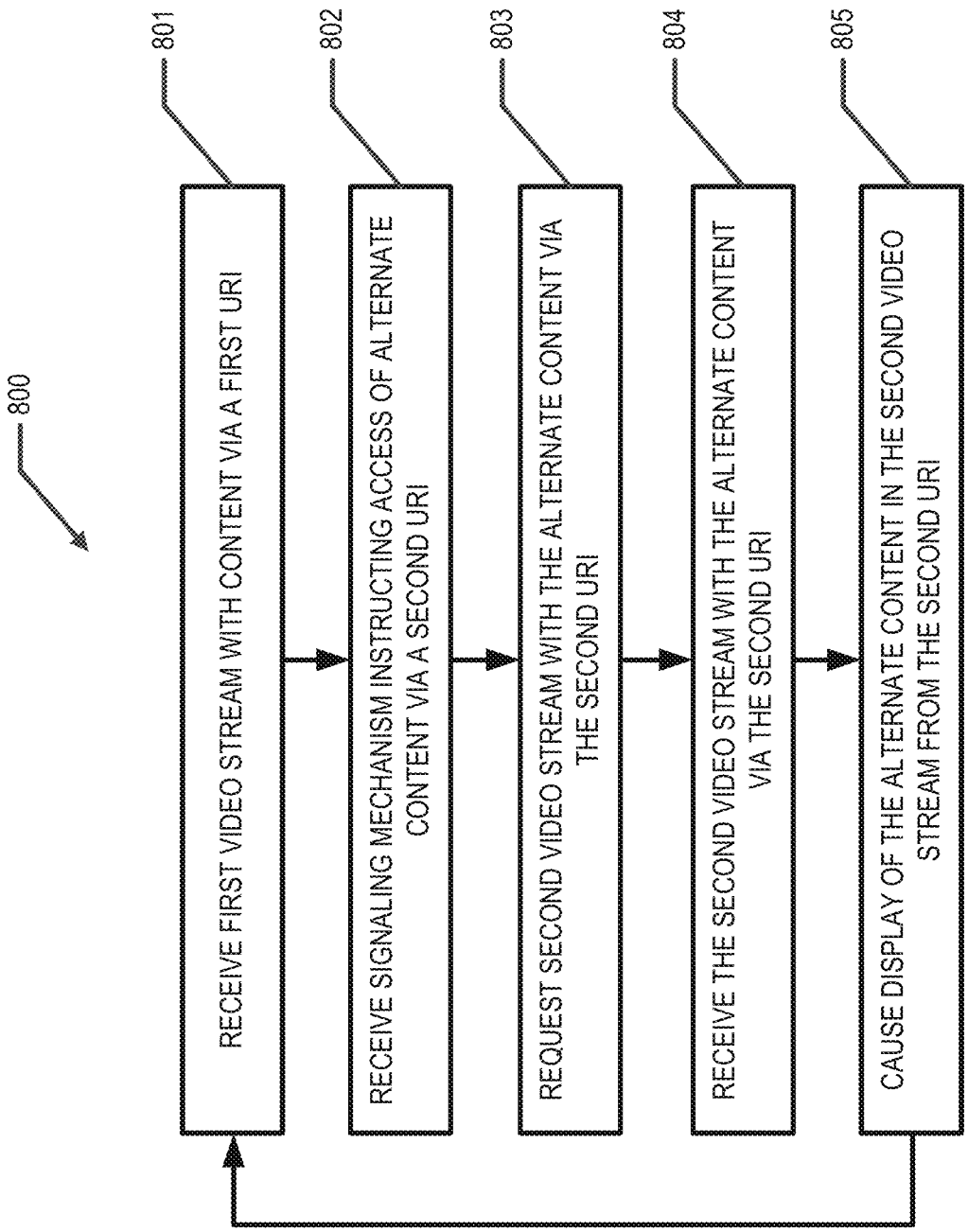

Therefore, turning now to FIG. 8, this figure shows the steps/operations 800 performed in various embodiments by the user computing entity 30 to provide alternate content to the user via multiple URIs. Accordingly, the user computing entity 30 receives a first video stream with content (e.g., as blocks/playlists/segments that are 30-120 seconds in length) via a first URI in step/operation 801. The user computing entity 30 can also cause display of at least a portion of the content over the first video stream.

During this time, the user computing entity 30 receives a signaling mechanism instructing access of alternate content via a second URI in step/operation 802. As a result, the user computing entity 30 requests the second video stream with the alternate content via the second URI in step/operation 803. The appropriate system/entity is made aware the second URI has been activated and provides the alternate content via a second video stream associated with the second URI. The user computing entity 30 receives the second video stream with the alternate content in step/operation 804 and causes display of the alternate content via the user interface for viewing in step/operation 805.

Once the alternate content is finished, the appropriate system/entity may continue to provide the remaining content at the conclusion of providing the alternate content via the second stream. Thus, depending on the embodiment, the user computing entity 30 may switch back to the first video stream to continue to receive the remaining content in step/operation 801, may not switch back to the first video stream and receive the remaining content via the second video stream, or may return the user to the user interface with a variety of options.

Example Embodiment: Command/Instruction for Alternate Content Using Single

FIG. 9 shows steps/operations 900 that may be performed by an appropriate system/entity (e.g., CDN 10, provider system 200, and/or intermediary system 20) to provide alternate content using a single URI. Accordingly, the appropriate system/entity provides a first video stream with content (e.g., as blocks/playlists/segments that are 30-120 seconds in length) via a first URI to a user computing entity 30 in step/operation 901. For instance, the first video stream may be a live stream, a VOD stream, and/or the like.

As previously discussed, a situation may arise that may need to be immediately communicated to users who are currently streaming content from the appropriate system/entity. Thus, as the content is being streamed over the first video stream, the appropriate system/entity may determine whether alternate content is available to be streamed to the user in step/operation 902. If not, then the appropriate system/entity continues to provide the first video stream with the content in step/operation 901.

However, if alternate content is available (e.g., breaking news is available and is still within its set duration of time), then the appropriate system/entity provides a signaling mechanism to the user computing entity 30 in step/operation 903. Here, the signaling mechanism may comprise information regarding alternate content that is available to the user for viewing. In addition, the signaling mechanism may include an instruction for the user computing entity 30 to access the alternate content via a video stream by re-activating the first URI. In other words, the alternate content is provided via the same URI, not a different one.

Accordingly, the user computing entity 30 may process the signaling instruction and access the video stream for the alternate content by using the first URI. However, the first URI is now associated with a second, different video stream. Correspondingly, the appropriate system/entity receives the re-activate request for the alternate content in step/operation 904. In turn, the appropriate system/entity pauses the first video stream in step/operation 905. As previously discussed, pausing the first video stream involves suspending the current block/playlist/segment for the content being streamed over the first video stream. For example, if the current block/playlist/segment is streamed over a 120 second time interval and the block/playlist/segment is only 30 seconds into the interval, then the appropriate system/entity suspends the block/playlist/segment at 30 seconds so that no further portion (the remaining time interval) of the block/playlist/segment is streamed over the first video stream to the user computing entity 30.

The appropriate system/entity then provides the alternate content over the second video stream that is now associated with the first URI in step/operation 906. As a result, the user computing entity 30 receives the second video stream with the alternate content and causes display of the alternate content via the user interface of for viewing before completion of the current block/playlist/segment being streamed for the content over the first video stream.

In particular embodiments, once the alternate content has been provided to the user computing entity 30 via the second video stream, the appropriate system/entity may receive a notice from the user computing entity 30 that the alternate content has finished in step/operation 907. At this point, the appropriate system/entity continues to provide the remaining content over the first video stream in step/operation 901. For instance, in particular embodiments, the appropriate system/entity may instruct the user computing entity 30 to re-activate the first URI to return to the first video stream at the conclusion of providing the alternate content via the second stream. As a result, the system/entity provides the remaining content over the first video stream by resuming the block/playlist/segment that was suspended for the content when the alternate content was provided. It should be noted that in some embodiments the appropriate system/entity may not necessarily receive a notice from user computing entity 30 that the alternate content has finished but instead may simply continue streaming the remaining content with the first video stream once the appropriate system/entity has finished streaming the alternate content.

Therefore, turning now to FIG. 10, this figure shows the steps/operations 1000 performed in various embodiments by the user computing entity 30 to provide the alternate content to the user. Accordingly, the user computing entity 30 receives a first video stream with content (e.g., as blocks/playlists/segments that are 30-120 seconds in length) via a first URI in step/operation 1001. The user computing entity 30 can also cause display of at least a portion of the content in the first video stream.

During streaming of the content over the first video stream, the user computing entity 30 receives a signaling mechanism instructing the user computing entity 30 to re-activate the first URI to access the alternate content in step/operation 1002. In response, the user computing entity 30 processes the signaling instruction and re-activates the first URI to access the alternate content in step/operation 1003. Correspondingly, the appropriate system/entity receives the request and provides the alternate content over a second video stream via the first URI. As a result, the user computing entity 30 receives the second video stream with the alternate content via the first URI in step/operation 1004 and causes display of the alternate content via a user interface for viewing before completion of the current block/playlist/segment for the content that is being streamed over the first video stream in step/operation 1005.

As previously discussed, in particular embodiments, the appropriate system/entity may continue to provide the remaining content at the conclusion of providing the alternate content via the second stream. For instance, in particular embodiments, the appropriate system/entity may do so by instructing the user computing entity 30 to re-activate the first URL to return to the first video stream. According, the user computing entity 30 may switch back to the first video stream using the first URL and continue receiving the remaining content in step/operation 1001. While in other embodiments, the appropriate system/entity may provide the remaining content over the second video stream at the conclusion of providing the alternate content. As previously noted, the appropriate system/entity continues streaming the remaining content by resuming the block/playlist/segment of the content that was suspended.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for providing alternate content, the computer-implemented method comprising:
streaming content via a first video stream to a user computing entity, wherein the first video stream is accessed by the user computing entity via a first uniform resource indicator (URI), and a plurality of segments are provided via the first video stream to facilitate streaming of the content; and
while streaming the content via the first video stream:
(1) determining that alternate content is available to be provided to the user computing entity; and
(2) responsive to determining that alternate content is available to be provided to the user computing entity:
(a) providing a signaling mechanism to the user computing entity indicating that alternate content is available; and
(b) responsive to receiving a request for the alternate content originating from the user computing entity:
(i) suspending a current segment of the plurality of segments that is currently being provided via the first video stream;
(ii) streaming the alternate content to the user computing entity via a second video stream accessed by the user computing entity via the first URI; and
(iii) responsive to receiving an indication of completion of streaming the alternate content via the second video stream, resuming the current segment of the plurality of segments to facilitate continued streaming of the content via the first URI.

2. The computer-implemented method of claim 1, wherein the continued streaming of the content is conducted over the first video stream.

3. The computer-implemented method of claim 2 further comprising providing the user computing entity with a request to re-activate the first URI to continue streaming the content via the first video stream upon completion of streaming the alternate content via the second video stream.

4. The computer-implemented method of claim 1, wherein the continued streaming of the content is conducted via the second video stream.

5. The computer-implemented method of claim 1, wherein the request for the alternate content is received as a result of a user of the user computing entity indicating a desire to view the alternate content.

6. The computer-implemented method of claim 1, wherein the alternate content comprises at least one of an emergency message, a news break, or a weather advisory.

7. A system for providing alternate content, the system comprising at least one processor and at least one memory including a computer program code, the at least one memory and the computer program code configured to, with the at least one processor, cause the system to:
stream content via a first video stream to a user computing entity, wherein the first video stream is accessed by the user computing entity via a first uniform resource indicator (URI), and a plurality of segments are provided via the first video stream to facilitate streaming of the content; and
while streaming the content via the first video stream:
(1) determine that alternate content is available to be provided to the user computing entity; and
(2) responsive to determining that alternate content is available to be provided to the user computing entity:
(a) provide a signaling mechanism to the user computing entity indicating that alternate content is available; and
(b) responsive to receiving a request for the alternate content originating from the user computing entity:
(i) suspend a current segment of the plurality of segments that is currently being provided via the first video stream;
(ii) stream the alternate content to the user computing entity via a second video stream accessed by the user computing entity via the first URI; and
(iii) responsive to receiving an indication of completion of streaming the alternate content via the second video stream, resume the current segment of the plurality of segments to facilitate continued streaming of the content via the first URI.

8. The system of claim 7, wherein the continued streaming of the content is conducted over the first video stream.

9. The system of claim 8, wherein the at least one memory and the computer program code are configured to, with the at least one processor, cause the system to have a request provided to the user computing entity to re-activate the first URI to continue streaming the content via the first video stream upon completion of streaming the alternate content via the second video stream.

10. The system of claim 7, wherein the continued streaming of the content is conducted via the second video stream.

11. The system of claim 7, wherein the request for the alternate content is received as a result of a user of the user computing entity indicating a desire to view the alternate content.

12. The system of claim 7, wherein the alternate content comprises at least one of an emergency message, a news break, or a weather advisory.

13. A non-transitory computer storage medium comprising instructions for providing alternate content, the instructions being configured to cause one or more processors to at least perform operations configured to:
stream content via a first video stream to a user computing entity, wherein the first video stream is accessed by the user computing entity via a first uniform resource indicator (URI), and a plurality of segments are provided via the first video stream to facilitate streaming of the content; and
while streaming the content via the first video stream:

(1) determine that alternate content is available to be provided to the user computing entity; and
(2) responsive to determining that alternate content is available to be provided to the user computing entity:
   (a) provide a signaling mechanism to the user computing entity indicating that alternate content is available; and
   (b) responsive to receiving a request for the alternate content originating from the user computing entity:
      (i) suspend a current segment of the plurality of segments that is currently being provided via the first video stream;
      (ii) stream the alternate content to the user computing entity via a second video stream accessed by the user computing entity via the first URI; and
      (iii) responsive to receiving an indication of completion of streaming the alternate content via the second video stream, resume the current segment of the plurality of segments to facilitate continued streaming of the content via the first URI.

14. The non-transitory computer storage medium of claim 13, wherein the continued streaming of the content is conducted over the first video stream.

15. The non-transitory computer storage medium of claim 14, wherein the instructions are configured to cause the one or more processors to at least perform operations configured to have a request provided to the user computing entity to re-activate the first URI to continue streaming the content via the first video stream upon completion of streaming the alternate content via the second video stream.

16. The non-transitory computer storage medium of claim 13, wherein the continued streaming of the content is conducted via the second video stream.

17. The non-transitory computer storage medium of claim 13, wherein the request for the alternate content is received as a result of a user of the user computing entity indicating a desire to view the alternate content.

18. The non-transitory computer storage medium of claim 13, wherein the alternate content comprises at least one of an emergency message, a news break, or a weather advisory.

* * * * *